FITZGERALD & SMITH.
Harvester.
No. 9,182
2 Sheets—Sheet 1.
Patented Aug. 10, 1852.
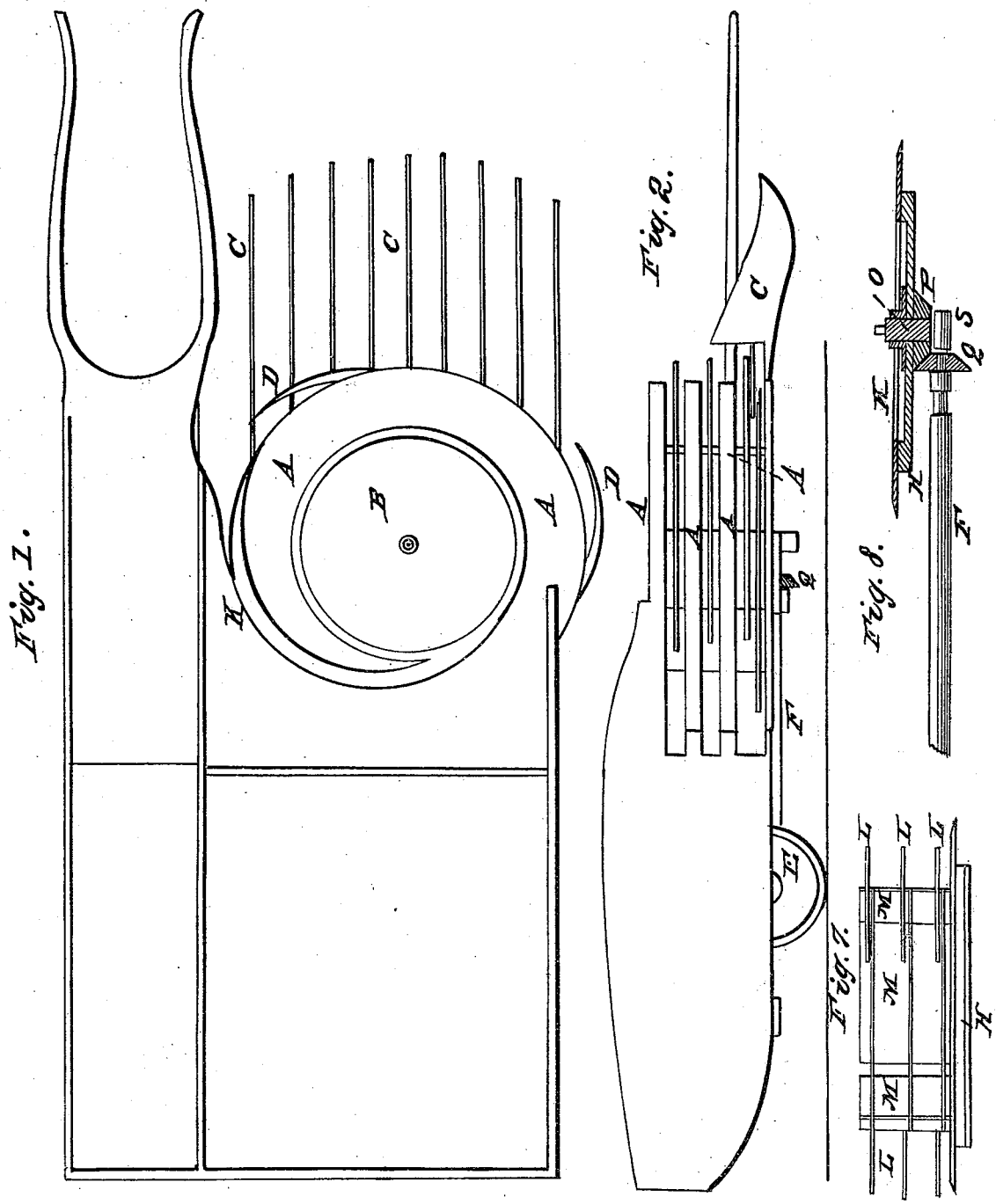

FITZGERALD & SMITH.
Harvester.
No. 9,182.
2 Sheets—Sheet 2.
Patented Aug. 10, 1852.
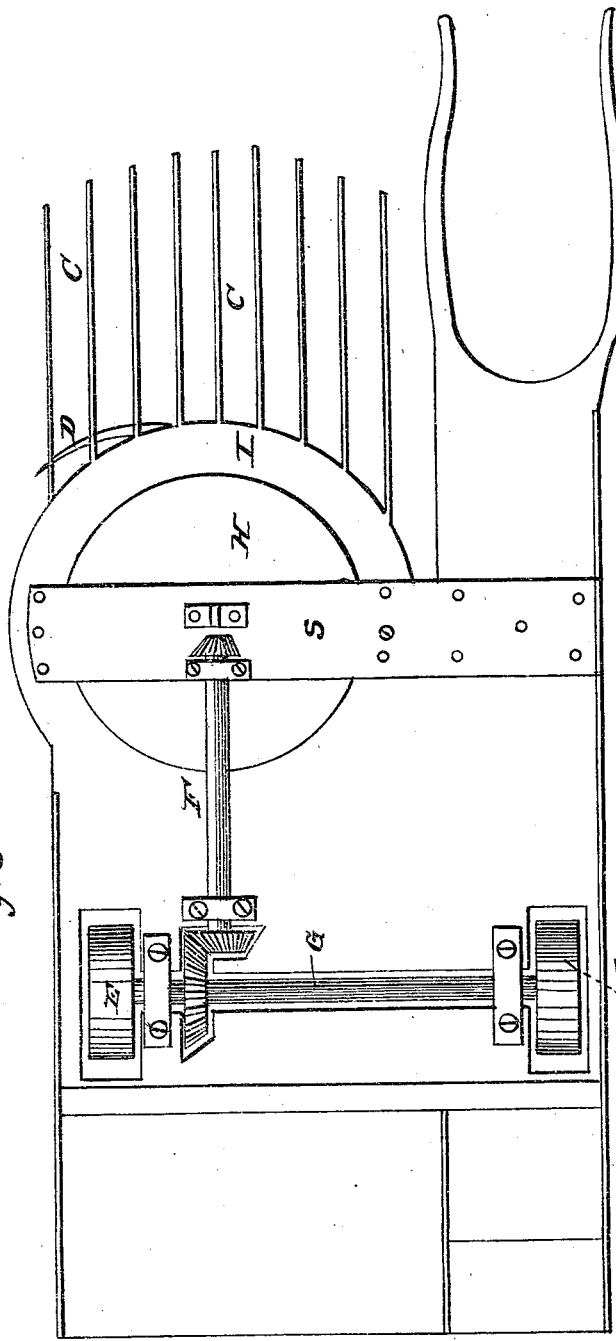
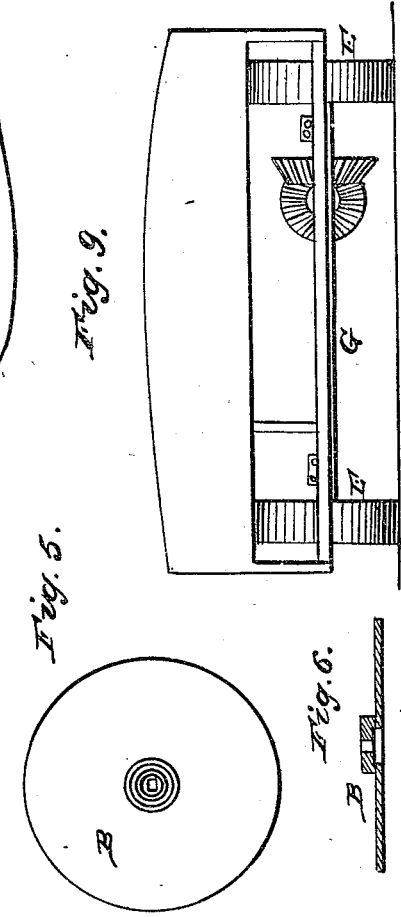
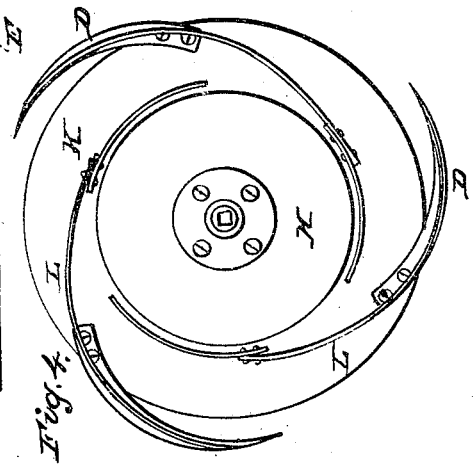

UNITED STATES PATENT OFFICE.

DANIEL FITZGERALD AND JOHN H. SMITH, OF NEW YORK, N. Y.

IMPROVEMENT IN GRAIN AND GRASS HARVESTERS.

Specification forming part of Letters Patent No. 9,182, dated August 10, 1852.

*To all whom it may concern:*

Be it known that we, DANIEL FITZGERALD and JOHN H. SMITH, of the city, county, and State of New York, have invented a new and useful Grain Cradling and Mowing Machine; and we hereby declare that the following is a full and exact description.

To enable others to make and use our invention, we proceed to describe its construction and operation, reference being had to the annexed drawings, which make part of this specification.

The nature of this invention is the adaptation of the common grain-cradler to machinery. The apparatus consists of a cart (the two wheels of which are the motors of the machinery) and the cradling apparatus attached. On the axle between the motor-wheels is a bevel cog-wheel, which connects with a bevel-pinion on a shaft under the machinery and lying longitudinally with the cart-body. This shaft drives, by means of a bevel-gear, the rotating cradler. This cradler is a cutting and gathering apparatus. On the bottom of the circle are scythes or knives which cut the grain in the revolution of the wheel or cradler; and to gather the grain there are curved fingers, as in the ordinary hand-cradle, which convey what is cut to the inside, where a man stands ready to throw it out to the rear part of the cart, and where it can be bound and either thrown out onto the ground or conveyed to the outskirts of the field.

The following is a more minute description:

Figure 1, plan of whole machine, looking down upon the top; Fig. 2, side elevation of the same; Fig. 3, plan of the bottom, showing the gearing; Fig. 4, the cutting-disk with the knives, &c.; Fig. 5, the center platform; Fig. 6, section of the same; Fig. 7, elevation of the cutting disk and fingers; Fig. 8, a section showing its gearing; Fig. 9, rear end of the machine.

For the cart-wheels, which are the motors, they may be made like any cart-wheels, except that they should have broad tires. They should be about four feet in diameter, and may be placed under the body of the machine, as represented, or outside, like the arrangements in ordinary vehicles. The latter we think the better plan. The axles must be set permanently in the hubs of the wheels, as in railroad-trucks. Upon the axles of the wheels is a bevel cog-wheel. Into this meshes a pinion upon a shaft, F, lying beneath the body of the machine longitudinally. On the forward end of this shaft is another bevel cog-wheel, which drives the cutting apparatus, (see Fig. 8, Plate II,) where H is a circular disk, beneath which is a bevel-pinion, P, meshes into the pinion Q on the horizontal shaft F. The stem or pivot O, Fig. 8, on which the cutting apparatus revolves is secured upon a bar across the body of the machine beneath. The pinion P is permanently secured to the under side of the disk, and is made to revolve with it upon the stem O. On the top of this permanent stem is set firmly the center platform, B, Fig. 5, upon which the man stands who is to throw out the grain when cut for the binders. Around the edge of the disk H is the cutting-rim K, upon which are fastened the knives or scythes D.

The "cradler," as we call the apparatus of fingers L and the guards M upon which they are placed, is built upon the disk H, Figs. 4 and 7. The guards M are segments of cylinders set on end upon the disk H—two, three, or four of them. Upon these there are secured the fingers L, which extend from the guards out to the outer side of the rim, and then curve in the same manner as the scythe or knife. The scythe and fingers in their general arrangement constitute an ordinary cradle for cutting grain. The edge of the rim K is made sharp, so that if the knives fail to cut the grain the edge of the disk will do it.

The spiral guides A, Figs. 1 and 2, are for conveying the grain when cut through the channel of the spiral to the center. By the motion of the scythes the grain is cut and the fingers force the grain into the spiral channel. The butts of the grain rest upon the rim K until the grain is deposited in the center. These guides may be made of strips of wood bent round to the proper shape of iron. They can be steadied or braced in their position by standards of iron (if carried high enough to let the grain pass under) connected with the body of the vehicle near the fills or tongue. The center platform, should it require steadying, may be braced in the same way.

The rate of motion required for the cutting apparatus will depend upon circumstances. It is evident that it should be about the same as that of the scythe or cradle in the hands of an expert mower or cradler. It will also depend on the amount that it is thought advisable to cut at each stroke. The motion of the horse being assumed at two miles an hour and the amount to be cut at each stroke six inches, (there being three knives on the disk,) the rate of motion will be readily determined by calculation, the wheels being four feet in diameter and geared so as to turn the cutting apparatus eight times to one. The disk with its three knives would revolve once each second, and cut in that time eighteen inches.

The elevators C are for lifting up the grain when lodged. They are shoved in front like sled-runners, and will generally rest on the ground to govern the height that the grain shall be cut. The elevators are few or many, as may be desired. A dozen would be enough. They are thin strips fastened beneath the forward part of the machine and set edge up. Their purpose is also to prevent the knives striking upon stones or roots.

What we claim as our invention, and desire to secure by Letters Patent, is—

1. The construction of the floor in the center, upon which a man may stand to gather the grain.

2. The construction of the rim K, to which the knives are attached, for the purpose of giving the butts of the grain a bed to stand upon while being carried through the channel to the center.

3. The constructing a spiral channel within the guards for the purpose of gathering the grain within the central space.

DANIEL FITZGERALD.
JOHN H. SMITH.

Witnesses:
 OWEN G. WARREN,
 GEORGE W. BLISS.